United States Patent
Kliger et al.

(10) Patent No.: US 7,697,522 B2
(45) Date of Patent: Apr. 13, 2010

(54) SYSTEMS AND METHODS FOR AGGREGATION OF PACKETS FOR TRANSMISSION THROUGH A COMMUNICATIONS NETWORK

(75) Inventors: Avi Kliger, Ramat Gan (IL); Yitshak Ohana, Jerusalem (IL)

(73) Assignee: Broadcom Corporation, Irvine, CA (US)

( * ) Notice: Subject to any disclaimer, the term of this patent is extended or adjusted under 35 U.S.C. 154(b) by 192 days.

(21) Appl. No.: 11/924,214

(22) Filed: Oct. 25, 2007

(65) Prior Publication Data

US 2008/0117919 A1    May 22, 2008

Related U.S. Application Data

(60) Provisional application No. 60/866,532, filed on Nov. 20, 2006, provisional application No. 60/866,527, filed on Nov. 20, 2006, provisional application No. 60/866,519, filed on Nov. 20, 2006, provisional application No. 60/907,111, filed on Mar. 21, 2007, provisional application No. 60/907,126, filed on Mar. 22, 2007, provisional application No. 60/907,819, filed on Apr. 18, 2007, provisional application No. 60/940,998, filed on May 31, 2007.

(51) Int. Cl.
H04L 12/26 (2006.01)
H04J 3/22 (2006.01)
H04J 3/24 (2006.01)

(52) U.S. Cl. .................. 370/389; 370/400; 370/473

(58) Field of Classification Search .............. 370/346, 370/449
See application file for complete search history.

(56) References Cited

U.S. PATENT DOCUMENTS

| | | | |
|---|---|---|---|
| 3,836,888 | A | 9/1974 | Boenke et al. |
| 4,413,229 | A | 11/1983 | Grant |
| 4,536,875 | A | 8/1985 | Kume et al. |
| 4,608,685 | A | 8/1986 | Jain et al. |
| 4,893,326 | A | 1/1990 | Duran et al. |

(Continued)

FOREIGN PATENT DOCUMENTS

EP            0 385695        9/1990

(Continued)

OTHER PUBLICATIONS

International Search Report for International Application No. PCT/US03/27253 dated Dec. 30, 2003 (5 pgs.).

(Continued)

*Primary Examiner*—Chirag G Shah
*Assistant Examiner*—Jenkey Van
(74) *Attorney, Agent, or Firm*—Weiss & Arons, LLP

(57) ABSTRACT

A system for transmitting packets over a home network of communication channels, typically coax cable, including a set of nodes, at least one having a packet aggregation functionality in which the node forms an aggregation frame by aggregating one or more packets which have accumulated at the node and transmits the frame. A network coordinator coordinates access of the nodes to the channels. At least one node is operative to inform the coordinator when it has formed an aggregation frame comprising a plurality of packets and to provide the coordinator with comparison information comparing different transmission possibilities for the frame. The coordinator, preferably responsively, determines whether, when, and which of, the aggregated packets can be transmitted.

24 Claims, 18 Drawing Sheets

U.S. PATENT DOCUMENTS

| | | | |
|---|---|---|---|
| 5,052,029 | A | 9/1991 | James et al. |
| 5,343,240 | A | 8/1994 | Yu |
| 5,421,030 | A | 5/1995 | Baran |
| 5,440,335 | A | 8/1995 | Beveridge |
| 5,671,220 | A | 9/1997 | Tonomura |
| 5,796,739 | A | 8/1998 | Kim et al. |
| 5,802,173 | A | 9/1998 | Hamilton-Piercy et al. |
| 5,805,591 | A | 9/1998 | Naboulsi et al. |
| 5,805,806 | A | 9/1998 | McArthur |
| 5,815,662 | A | 9/1998 | Ong |
| 5,822,677 | A | 10/1998 | Peyrovian |
| 5,822,678 | A | 10/1998 | Evanyk |
| 5,845,190 | A | 12/1998 | Bushue et al. |
| 5,850,400 | A | 12/1998 | Eames et al. |
| 5,854,887 | A | 12/1998 | Kindell et al. |
| 5,877,821 | A | 3/1999 | Newlin et al. |
| 5,886,732 | A | 3/1999 | Humpleman |
| 5,896,556 | A | 4/1999 | Moreland et al. |
| 5,917,624 | A | 6/1999 | Wagner |
| 5,930,493 | A | 7/1999 | Ottesen et al. |
| 5,963,844 | A | 10/1999 | Dail |
| 5,982,784 | A | 11/1999 | Bell |
| 6,009,465 | A | 12/1999 | Decker et al. |
| 6,055,242 | A | 4/2000 | Doshi et al. |
| 6,069,588 | A | 5/2000 | O'Neill, Jr. |
| 6,081,519 | A | 6/2000 | Petler |
| 6,081,533 | A | 6/2000 | Laubach et al. |
| 6,118,762 | A * | 9/2000 | Nomura et al. ............. 370/230 |
| 6,157,645 | A | 12/2000 | Shobatake |
| 6,167,120 | A | 12/2000 | Kikinis |
| 6,219,409 | B1 | 4/2001 | Smith et al. |
| 6,229,818 | B1 | 5/2001 | Bell |
| 6,243,413 | B1 | 6/2001 | Beukema |
| 6,304,552 | B1 * | 10/2001 | Chapman et al. ............. 370/232 |
| 6,307,862 | B1 | 10/2001 | Silverman |
| 6,466,651 | B1 | 10/2002 | Dailey |
| 6,481,013 | B1 | 11/2002 | Dinwiddie et al. |
| 6,526,070 | B1 | 2/2003 | Bernath et al. |
| 6,553,568 | B1 | 4/2003 | Fijolek et al. |
| 6,563,829 | B1 | 5/2003 | Lyles et al. |
| 6,611,537 | B1 | 8/2003 | Edens et al. |
| 6,622,304 | B1 | 9/2003 | Carhart |
| 6,637,030 | B1 | 10/2003 | Klein |
| 6,650,624 | B1 | 11/2003 | Quigley et al. |
| 6,745,392 | B1 | 6/2004 | Basawapatna et al. |
| 6,763,032 | B1 | 7/2004 | Rabenko et al. |
| 6,816,500 | B1 | 11/2004 | Mannette et al. |
| 6,831,899 | B1 | 12/2004 | Roy |
| 6,862,270 | B1 * | 3/2005 | Ho ............................. 370/328 |
| 6,950,399 | B1 | 9/2005 | Bushmitch et al. |
| 6,985,437 | B1 | 1/2006 | Vogel |
| 7,035,270 | B2 | 4/2006 | Moore et al. |
| 7,065,779 | B1 | 6/2006 | Crocker et al. |
| 7,089,580 | B1 | 8/2006 | Vogel et al. |
| 7,116,685 | B2 | 10/2006 | Brown et al. |
| 7,127,734 | B1 | 10/2006 | Amit |
| 7,133,697 | B2 | 11/2006 | Judd et al. |
| 7,146,632 | B2 | 12/2006 | Miller |
| 7,296,083 | B2 * | 11/2007 | Barham et al. ............. 709/232 |
| 7,487,532 | B2 | 2/2009 | Robertson et al. |
| 7,606,256 | B2 | 10/2009 | Vitebsky et al. |
| 2001/0039660 | A1 | 11/2001 | Valsilevsky |
| 2002/0021465 | A1 | 2/2002 | Moore et al. |
| 2002/0059623 | A1 | 5/2002 | Rodriguez et al. |
| 2002/0059634 | A1 | 5/2002 | Terry et al. |
| 2002/0078247 | A1 | 6/2002 | Lu et al. |
| 2002/0078249 | A1 | 6/2002 | Lu et al. |
| 2002/0097821 | A1 | 7/2002 | Hebron et al. |
| 2002/0136231 | A1 | 9/2002 | Leathurbury |
| 2002/0141347 | A1 | 10/2002 | Harp et al. |
| 2002/0150155 | A1 | 10/2002 | Florentin et al. |
| 2002/0166124 | A1 | 11/2002 | Gurantz et al. |
| 2002/0174423 | A1 | 11/2002 | Fifield et al. |
| 2002/0194605 | A1 | 12/2002 | Cohen et al. |
| 2003/0013453 | A1 | 1/2003 | Lavaud et al. |
| 2003/0016751 | A1 | 1/2003 | Vetro et al. |
| 2003/0063563 | A1 | 4/2003 | Kowalski |
| 2003/0152059 | A1 * | 8/2003 | Odman ....................... 370/338 |
| 2003/0169769 | A1 * | 9/2003 | Ho et al. .................... 370/473 |
| 2003/0193619 | A1 | 10/2003 | Farrand |
| 2003/0198244 | A1 * | 10/2003 | Ho et al. .................... 370/442 |
| 2004/0107445 | A1 | 6/2004 | Amit |
| 2004/0163120 | A1 | 8/2004 | Rabenko et al. |
| 2004/0258062 | A1 | 12/2004 | Narvaez |
| 2005/0015703 | A1 * | 1/2005 | Terry et al. ................. 714/776 |
| 2005/0152359 | A1 * | 7/2005 | Giesberts et al. ........... 370/389 |
| 2005/0175027 | A1 | 8/2005 | Miller et al. |
| 2005/0204066 | A9 | 9/2005 | Cohen et al. |
| 2006/0062250 | A1 | 3/2006 | Payne |
| 2006/0078001 | A1 * | 4/2006 | Chandra et al. ............. 370/473 |
| 2006/0256818 | A1 * | 11/2006 | Shvodian et al. ............ 370/474 |
| 2006/0268934 | A1 | 11/2006 | Shimizu et al. |
| 2006/0280194 | A1 * | 12/2006 | Jang et al. ................... 370/412 |
| 2007/0127373 | A1 | 6/2007 | Ho et al. |
| 2007/0206551 | A1 | 9/2007 | Moorti et al. |
| 2008/0189431 | A1 | 8/2008 | Hyslop et al. |
| 2008/0238016 | A1 * | 10/2008 | Chen et al. ............. 280/124.145 |
| 2009/0010263 | A1 | 1/2009 | Ma et al. |

FOREIGN PATENT DOCUMENTS

| | | |
|---|---|---|
| EP | 0 622926 | 11/1994 |
| EP | 1501326 A1 * | 1/2005 |
| WO | WO 98/27748 | 6/1998 |
| WO | WO 98/31133 | 7/1998 |
| WO | WO 99/35753 | 7/1999 |
| WO | WO 99/46734 | 9/1999 |
| WO | WO 00/31725 | 6/2000 |
| WO | WO 00/55843 | 9/2000 |
| WO | WO 01/80030 | 10/2001 |
| WO | WO 02/19623 | 3/2002 |

OTHER PUBLICATIONS

International Search Report for International Application No. PCT/US03/27254 dated Feb. 3, 2004 (5 pgs.).

Multichannel News, MoCA Brewing Up Bigger Bandwidth, Dec. 15, 2008 Interview with CTO Anton Monk, http://www.multichannel.com/article/160878-MoCA_Brewing_Up_bigger_Bandwidth.php downloaded on Mar. 29, 2009.

* cited by examiner

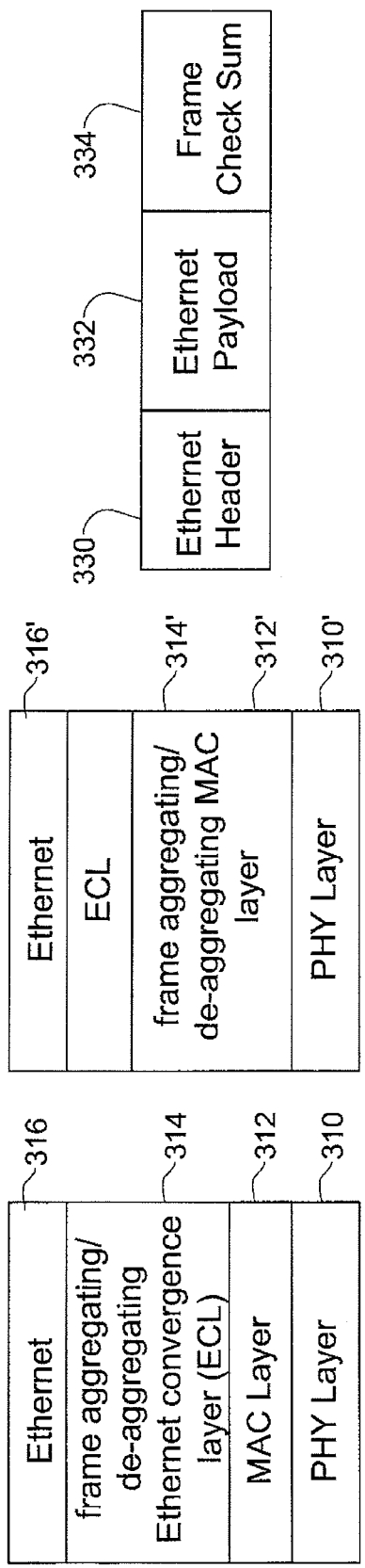
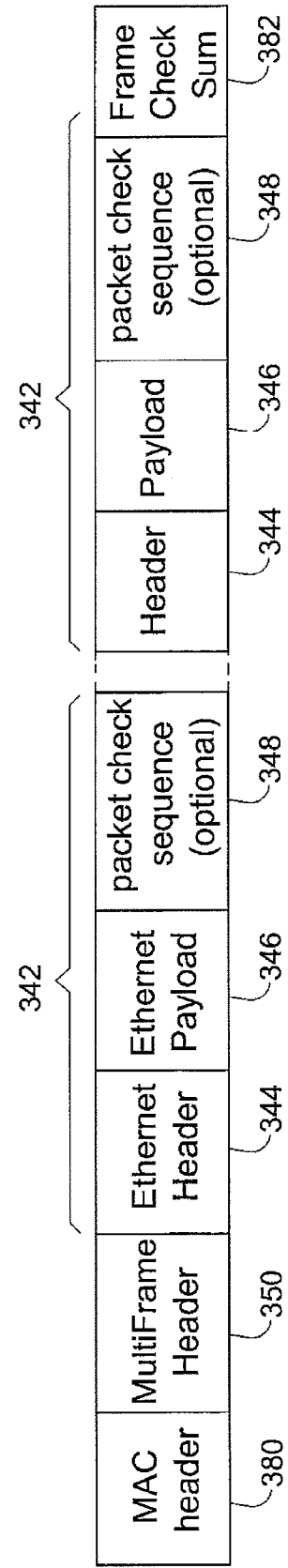
FIG. 4A
FIG. 4B
FIG. 5
FIG. 6

| Field | Length | Usage |
|---|---|---|
| FRAME_SUBTYPE | 4 bits | If FRAME_TYPE = MAP<br>  0x0 = Asynchronous MAP<br>If FRAME_TYPE = Reservation Request<br>  0x0 = Asynchronous<br>If FRAME_TYPE = Control<br>  0x0 – Type I/III Probe Report<br>  0x1 – Admission Request<br>  0x2 – Admission response<br>  0x3 – Key distribution<br>  0x4 – Dynamic Key distribution<br>  0x5 – Type I/III Probe Report Request<br>  0x6 – Link Acknowledgement<br>  0x7 – Type II Probe Report<br>  0x8 – Periodic Link Packet<br>  0x9 – Power Control<br>  0xA – Power Control Response<br>  0xB – Power Control Acknowledgement<br>  0xC – Power Control Update<br>  0xD – Topology update<br>  0xE – Unicast MAC Address Notification<br>  0xF – reserved<br>If FRAME_TYPE = Ethernet transmission<br>  0x0 = ETHERNET_PACKET<br>  0x1 = Ethernet Aggregate<br>If FRAME_TYPE = MPEG or DSS<br>  Field is Reserved<br>If FRAME_TYPE = Terminal allocation<br>  0x0 = Terminal allocation<br>If FRAME_TYPE = Beacon<br>  0x0 = Beacon |
| FRAME_TYPE | 4 bits | Indicates the type of transmission for which the time is being allocated. Only following values are allowed.<br>0x0 = MAP<br>0x1 = Reservation request<br>0x2 = Control<br>0x3 = Ethernet transmission<br>0x5 = MPEG transmission<br>0x6 = DSS transmission<br>0xA = Terminal allocation (TAU)<br>0xC = Beacon |

FIG. 9

| Field | Length | Usage |
|---|---|---|
| MAC Header | | |
| TRANSMIT_CLOCK | 32 bits | As defined in Appendix A of MoCA spec |
| PACKET_SUBTYPE | 4 bits | 0x1 Ethernet Aggregate |
| PACKET_TYPE | 4 bits | Ethernet (0x3) |
| VERSION | 8 bits | As defined in Appendix A of MoCA spec |
| RESERVED | 8 bits | |
| SOURCE_NODE_ID | 8 bits | Source node ID |
| RESERVED | 8 bits | |
| DESTINATION_NODE_ID | 8 bits | Destination node ID |
| PACKET_LENGTH | 16 bits | As defined in Appendix A of MoCA spec |
| RESERVED | 32 bits | 0x1 Ethernet Aggregate |
| HEADER_CHECKSUM | 16 bits | CRC on MAC header bits (as defined in Appendix A of MoCA spec) |
| MSDU Header – 1 | | |
| RESERVED | 2 bits | |
| FRAME_HEADER | 14 bits | The length of the following Ethernet frame |
| HEADER_CHECKSUM | 16 bits | CRC on MAC header bits (as defined in Appendix A of MoCA spec) |
| Frame Payload – 1 | | |
| for (i=0; i<N; i++) { Payload bytes | | N = number of bytes of payload |
| DATA_BYTES | 8 bits | |
| } | | |
| Frame CRC – 1 | | |
| FRAME_CRC | 32 bits | |
| . | | |
| . | | |
| . | | |
| MSDU Header – N | | |
| ... | | |
| Frame Payload – N | | |
| ... | | |
| Frame CRC – N | | |
| ... | | |

FIG. 10

| Field | Length | Usage |
| --- | --- | --- |
| FRAME_SUBTYPE | 4 bits | 0x1 = Ethernet Aggregate |
| FRAME_TYPE | 4 bits | 0x3 = Ethernet transmission |
| DESTINATION | 8 bits | Node ID of the destination node |
| PHY_PROFILE | | Indicates the type of modulation scheme used for this transmission<br>bits 7:6<br>00 = profile sequence 0<br>01 = profile sequence 1<br>bits 5:0<br>0x2 = Diversity Mode profile<br>0x7 = Unicast profile<br>0x8 = Broadcast profile<br>All other values reserved |
| REQUEST_ID | 7 bits | A sequence number associated with the request. |
| | 1 bit | A one bit toggle sequence |
| SAVE_DURATION | 12 bits | The time saved if sending this packet in aggregation frame |
| PRIORITY | 4 bits | If FRAME_TYPE = Ethernet Transmission<br>0x0 – Low Priority<br>0x1 – Medium Priority<br>0x2 – High Priority |
| DURATION | 16 bits | Transmission time required for this packet if no sending in aggregation frame<br>The duration is multiples of SLOT_TIME |

FIG. 11

| Field | Length | Usage |
|---|---|---|
| FRAME_SUBTYPE | 4 bits | 0x1 = Ethernet Aggregate |
| FRAME_TYPE | 4 bits | 0x3 = Ethernet transmission |
| SRC | 8 bits | ID of source node for the transmission |
| DESTINATION | 8 bits | Node ID of the destination node |
| PHY_PROFILE | | Indicates the type of modulation scheme used for this transmission<br>bits 7:6<br>00 = profile sequence 0<br>01 = profile sequence 1<br>bits 5:0<br>0x2 = Diversity Mode profile<br>0x7 = Unicast profile<br>0x8 = Broadcast profile<br>All other values reserved |
| REQUEST_ID | 7 bits | The last sequence number of the last RR element in the aggregated packet. |
| | 1 bit | A one bit toggle sequence – same as RR element |
| IFG_TYPE | 4 bits | IFG value between previous and current allocation unit.<br>0x0 = Default IFG (= 500 x SLOT_TIME) |
| OFFSET | 20bits | Time from the VALID_FROM field of the MAP to the beginning of transmission of this packet (including PHY overheads) as a multiple of SLOT_TIME |

FIG. 12

| Field | Length | Usage |
|---|---|---|
| FRAME_SUBTYPE | 4 bits | If FRAME_TYPE = MAP<br>  0x0 = Asynchronous MAP<br>If FRAME_TYPE = Reservation Request<br>  0x0 = Asynchronous<br>If FRAME_TYPE = Control<br>  0x0 – Type I/III Probe Report<br>  0x1 – Admission Request<br>  0x2 – Admission response<br>  0x3 – Key distribution<br>  0x4 – Dynamic Key distribution<br>  0x5 – Type I/III Probe Report Request<br>  0x6 – Link Acknowledgement<br>  0x7 – Type II Probe Report<br>  0x8 – Periodic Link Packet<br>  0x9 – Power Control<br>  0xA – Power Control Response<br>  0xB – Power Control Acknowledgement<br>  0xC – Power Control Update<br>  0xD – Topology update<br>  0xE – Unicast MAC Address Notification<br>  0xF – reserved<br>If FRAME_TYPE = Ethernet transmission<br>  0x0 = ETHERNET_PACKET<br>  0x1 = AGGREGATED ETHERNET PACKET<br>If FRAME_TYPE = MPEG or DSS<br>  Field is Reserved<br>If FRAME_TYPE = Terminal allocation<br>  0x0 = Terminal allocation<br>If FRAME_TYPE = Beacon<br>  0x0 = Beacon |
| FRAME_TYPE | 4 bits | Indicates the type of transmission for which the time is being allocated. Only following values are allowed.<br>0x0 = MAP<br>0x1 = Reservation request<br>0x2 = Control<br>0x3 = Ethernet transmission<br>0x5 = MPEG transmission<br>0x6 = DSS transmission<br>0xA = Terminal allocation (TAU)<br>0xC = Beacon |

Frame Type & Sub Type Format

FIG. 15

| Field | Length | Usage |
|---|---|---|
| MAC Header | | |
| TRANSMIT_CLOCK | 32 bits | As defined in Appendix A. |
| PACKET_SUBTYPE | 4 bits | Aggregated Ethernet (0x1) |
| PACKET_TYPE | 4 bits | Ethernet (0x3) |
| VERSION | 8 bits | As defined in Appendix A |
| RESERVED | 8 bits | |
| SOURCE_NODE_ID | 8 bits | Source node ID |
| RESERVED | 8 bits | |
| DESTINATION_NODE_ID | 8 bits | Destination node ID |
| PACKET_LENGTH | 16 bits | As defined in Appendix A |
| RESERVED | 32 bits | |
| HEADER_CHECKSUM | 16 bits | CRC on MAC header bits (as defined in Appendix A) |
| MSDU Header – 1 | | |
| RESERVED | 2 bits | |
| FRAME_HEADER | 14 bits | Number of Bytes in the following Ethernet packet payload (N) |
| HEADER_CHECKSUM | 16 bits | CRC on MAC header bits (as defined in Appendix A) |
| Frame Payload – 1 | | |
| For (i=0; i<N; i++) { Payload bytes | | N = (number of bytes of payload) |
| DATA_BYTES | 8 bits | |
| } | | |
| Frame CRC – 1 | | |
| FRAME_CRC | 32 bits | |
| . | | |
| . | | |
| . | | |
| MSDU Header – n | | |
| RESERVED | 2 bits | |
| FRAME_HEADER | 14 bits | The length of the following Ethernet frame |
| HEADER_CHECKSUM | 16 bits | CRC on MAC header bits (as defined in Appendix A) |
| Frame Payload – n | | |
| For (i=0; i<N; i++) { Payload bytes | | N = (number of bytes of payload) |
| DATA_BYTES | 8 bits | |
| } | | |
| Frame CRC – n | | |
| … | | |

Aggregated Ethernet SDU format

FIG. 16

| Field | Length | Usage |
| --- | --- | --- |
| FRAME_SUBTYPE | 4 bits | 0x1 = Aggregated Ethernet |
| FRAME_TYPE | 4 bits | 0x3 = Ethernet transmission |
| DESTINATION | 8 bits | Node ID of the destination node |
| PHY_PROFILE | 8 bits | Indicates the type of modulation scheme used for this transmission<br>bits 7:6<br>00 = profile sequence 0<br>01 = profile sequence 1<br>bits 5:0<br>0x2 = Diversity Mode profile<br>0x7 = Unicast profile<br>0x8 = Broadcast profile<br>All other values reserved |
| REQUEST_ID | 8 bits | A sequence number associated with the request. |
| PRIORITY | 4 bits | If FRAME_TYPE = Ethernet Transmission<br>0x0 – Low Priority<br>0x1 – Medium Priority<br>0x2 – High Priority |
| RESERVED | 4 bits | |
| OVERHEAD_DURATION | 16 bits | The transmission time required for sending the burst overhead (preamble and channel estimation) |
| NUM_SUB_ELEMENTS | 8 bits | The number of aggregation sub elements |
| for (i=0; i<NUM_SUB_ELEMENTS; i++) | | N = number of elements |
| { | | |
| SUB_ELEMENT_NO | 8 bits | The sub element number. The first starting with 1 |
| RESERVED | 8 bits | |
| DURATION | 16 bits | Transmission time required for this part of the aggregation frame (except the overhead)<br>The duration is multiples of SLOT_TIME |
| } | | |

Asynchronous Aggregated Data Reservation Request Element Format

FIG. 19

| Field | Length | Usage |
|---|---|---|
| FRAME_SUBTYPE | 4 bits | 0x1 = Aggregated Ethernet |
| FRAME_TYPE | 4 bits | 0x3 = Ethernet transmission |
| SRC | 8 bits | ID of source node for the transmission |
| DESTINATION | 8 bits | Node ID of the destination node |
| PHY_PROFILE | 8 bits | Indicates the type of modulation scheme used for this transmission<br>bits 7:6<br>00 = profile sequence 0<br>01 = profile sequence 1<br>bits 5:0<br>0x2 = Diversity Mode profile<br>0x7 = Unicast profile<br>0x8 = Broadcast profile<br>All other values reserved |
| REQUEST_ID | 8 bits | Transaction or request ID of the transmission |
| FROM_SUB_ELEMENT | 8 bits | The first AQ corresponding to this AU (Allocation Unit) |
| TO_SUB_ELEMENT | 8 bits | The last AQ corresponding to this AU (Allocation Unit) |
| IFG_TYPE | 4 bits | IFG value between previous and current allocation unit.<br>0x0 = Default IFG (= 500 x SLOT_TIME) |
| OFFSET | 20bits | Time from the VALID_FROM field of the MAP to the beginning of transmission of this packet (including PHY overheads) as a multiple of SLOT_TIME |

Aggregated Data Allocation Unit Format

FIG. 20

SYSTEMS AND METHODS FOR AGGREGATION OF PACKETS FOR TRANSMISSION THROUGH A COMMUNICATIONS NETWORK

REFERENCE TO CO-PENDING APPLICATIONS

This is a nonprovisional of the following U.S. Provisional Applications, all of which are hereby incorporated by reference herein in their entireties: U.S. Provisional Application No. 60/866,532, entitled, "A METHOD FOR PACKET AGGREGATION IN A COORDINATED HOME NETWORK", filed on Nov. 20, 2006, U.S. Provisional Application No 60/866,527, entitled, "RETRANSMISSION IN COORDINATED HOME NETWORK" filed on Nov. 20, 2006, U.S. Provisional Application No. 60/866,519, entitled, "IQ IMBALANCE CORRECTION USING 2-TONE SIGNAL IN MULTI-CARRIER RECEIVERS", filed on Nov. 20, 2006, U.S. Provisional Application No. 60/907,111, "SYSTEM AND METHOD FOR AGGREGATION OF PACKETS FOR TRANSMISSION THROUGH A COMMUNICATIONS NETWORK" filed on Mar. 21, 2007, U.S. Provisional Application No. 60/907,126, entitled, "MAC TO PHY INTERFACE APPARATUS AND METHODS FOR TRANSMISSION OF PACKETS THROUGH A COMMUNICATIONS NETWORK", filed on Mar. 22, 2007, U.S. Provisional Application No. 60/907,819, entitled "SYSTEMS AND METHODS FOR RETRANSMITTING PACKETS OVER A NETWORK OF COMMUNICATION CHANNELS", filed on Apr. 18, 2007, and U.S. Provisional Application No. 60/940,998, entitled "MOCA AGGREGATION", filed on May 31, 2007.

FIELD OF THE INVENTION

The present invention relates generally to information networks and specifically to transmitting information such as media information over communication lines such as coaxial cable (hereinafter "coax"), thereby to form a communications network.

BACKGROUND OF THE INVENTION

Home networking over coax is a known technology which has vast commercial potential.

Home network technologies having a packet aggregation functionality are known generally. The Multimedia over Coax Alliance (MoCA™), at its website mocalliance.org, provides an example of a suitable specification (MoCA 1.0) for networking of digital video and entertainment through existing coaxial cable in the home which has been distributed to an open membership. Packet aggregation functionality is not provided. MoCA 1.0 specification is incorporated by reference herein in its entirety.

Home networking over coax taps into the vast amounts of unused bandwidth available on the in-home coax. More than 70% of homes in the United States have coax already installed into the home infrastructure. Many have existing coax in one or more primary entertainment consumption locations such as family rooms, media rooms and master bedrooms—ideal for deploying networks. Home networking technology allows homeowners to utilize this infrastructure as a networking system and to deliver other entertainment and information programming with high QoS (Quality of Service).

The technology underlying home networking over coax provides high speed (270 mbps), high QoS, and the innate security of a shielded, wired connection combined with state of the art packet-level encryption. Coax is designed for carrying high bandwidth video. Today, it is regularly used to securely deliver millions of dollars of pay per view and premium video content on a daily basis. Home networking over coax can also be used as a backbone for multiple wireless access points used to extend the reach of wireless network throughout a consumer's entire home.

Home networking over coax provides a consistent, high throughput, high quality connection through the existing coaxial cables to the places where the video devices currently reside in the home without affecting the existing analog or digital services present on the cable. Home networking over coax provides a primary link for digital entertainment, and may also act in concert with other wired and wireless networks to extend the entertainment experience throughout the home.

Currently, home networking over coax works with access technologies such as ADSL and VDSL services or Fiber to the Home (FTTH), that typically enter the home on a twisted pair or on an optical fiber, operating in a frequency band from a few hundred kilohertz to 8.5 MHz for ADSL and 12 MHZ for VDSL. As services reach the home via xDSL or FTTH, they may be routed via home networking over coax technology and the in-home coax to the video devices. Cable functionalities, such as video, voice and Internet access, may be provided to homes, via coaxial cable, by cable operators, and use coaxial cables running within the homes to reach individual cable service consuming devices locating in various rooms within the home. Typically, home networking over coax type functionalities run in parallel with the cable functionalities, on different frequencies.

The coax infrastructure inside the house typically includes coaxial wires and splitters. Splitters used in homes typically have one input and two or more outputs and are designed to transfer signals from input to outputs in the forward direction, or from outputs to input in the backward direction and to isolate splitter outputs and prevent signals from flowing room/outlet to room/outlet. Isolation is useful in order to a) reduce interference from other devices and b) maximize power transfer from Point Of Entry (POE) to outlets for best TV reception.

The MoCA technology is specifically designed to go backwards through splitters (insertion) and go from splitter output to output (isolation). All outlets in a house can be reached from each other by a single ":isolation jump" and a number of "insertion jumps". Typically isolation jumps have an attenuation of 5 to 40 dB and each insertion jump attenuates approximately 3 dB. MoCA has a dynamic range in excess of 55 dB while supporting 200 Mbps throughput. Therefore MoCA can work effectively through a significant number of splitters.

MoCA is a managed network unlike some other home networking technologies. It is specifically designed to support streaming video without packet loss providing very high video quality between outlets.

Digital cable programming is delivered with threshold Packet Error Rate (PER) of below 1e-6. The home network should preferably have similar or better performance so as not to degrade viewing.

The disclosures of any publications and patent documents mentioned in the specification, and of the publications and patent documents cited therein directly or indirectly, are hereby incorporated by reference.

SUMMARY OF THE INVENTION

A system and/or method for aggregation of packets for transmission through a communications network, substantially as shown in and/or described in connection with at least one of the figures, as set forth more completely in the claims.

BRIEF DESCRIPTION OF THE DRAWINGS

Preferred embodiments of the present invention are illustrated in the following drawings:

FIG. 4 is a prior art diagram of conventional ISO mode layers in a LAN network.

FIG. 5 is a prior art diagram of a conventional structure for an Ethernet packet.

FIG. 6 is a prior art diagram of a conventional structure for an aggregation frame comprising more than one Ethernet packets, constructed and operative in accordance with a preferred embodiment of the present invention.

FIG. 9 is a table of Frame Types and Sub Type Formats in accordance with a preferred embodiment of the present invention.

FIG. 10 is a table summarizing Ethernet Aggregate SDU format in accordance with a preferred embodiment of the present invention.

FIG. 11 is a table summarizing a format for an Asynchronous Aggregate Data Reservation Request Element in accordance with a preferred embodiment of the present invention.

FIG. 12 is a table summarizing a format for Aggregate Data Allocation in accordance with a preferred embodiment of the present invention.

FIG. 15 shows a Table depicting a structure of the MAC header according to the invention.

FIG. 16 shows a Table depicting a structure of the Aggregated Ethernet format according to the invention.

FIG. 19 a table illustrating an asynchronous aggregated data reservation request element format for use with systems and methods according to the invention.

FIG. 20 shows a table illustrating an aggregated data allocation unit format according to the invention.

DETAILED DESCRIPTION OF PREFERRED EMBODIMENTS

Figure 1:
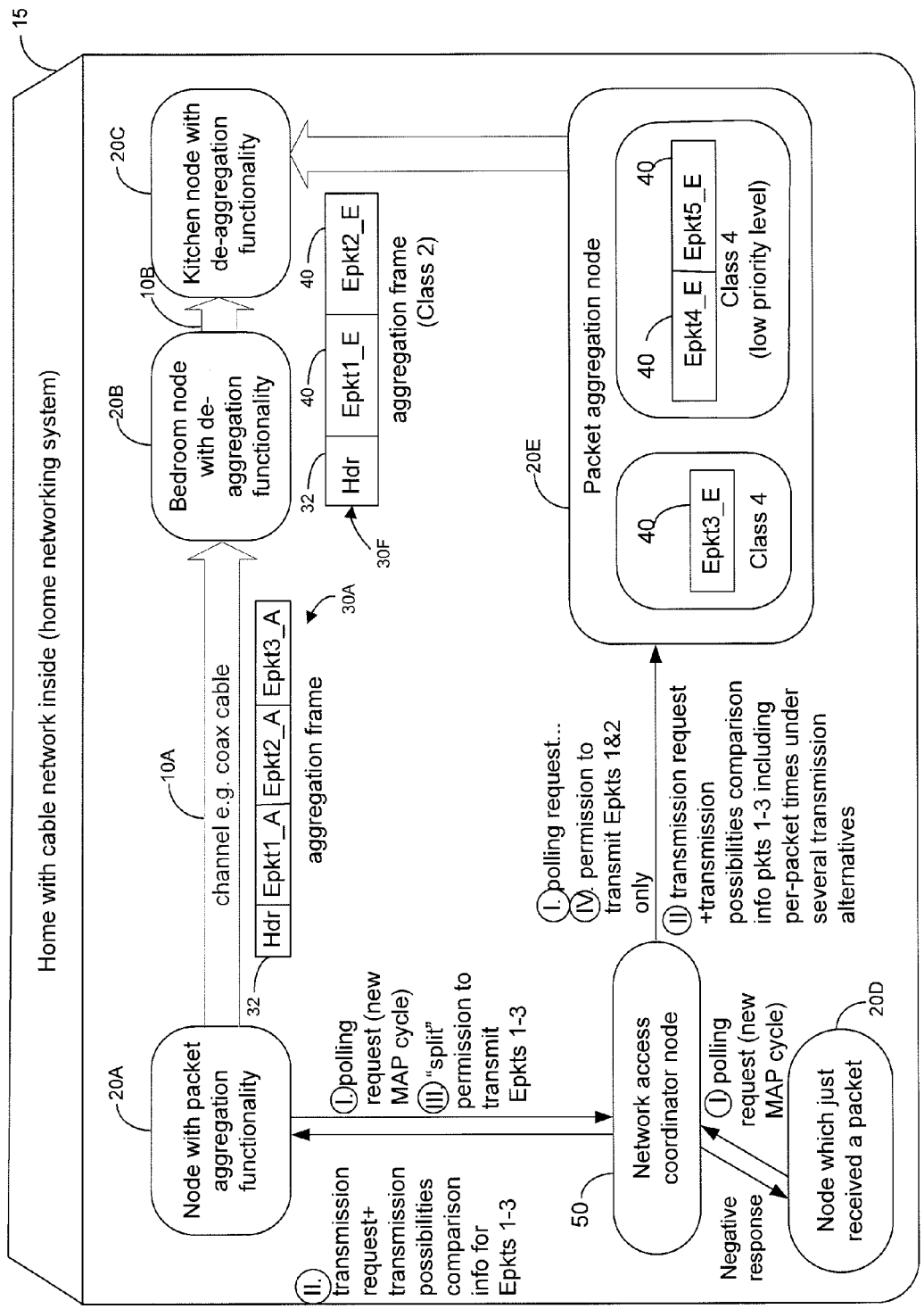
FIG. 1 is a simplified block diagram illustration of a home networking over coax system having a packet aggregation functionality and being constructed and operative in accordance with a preferred embodiment of the present invention.

FIG. 1 is a simplified block diagram illustration of a home networking over coax system having a packet aggregation functionality and being constructed and operative in accordance with a preferred embodiment of the present invention. The system of FIG. 1 is operative for transmitting packets over a network of communication channels within a home 15 (such as, for example, the channels indicated in FIG. 1 by reference numerals 10A and 10B, referred to collectively hereinafter as "channels 10"). The channels may be wired channels e.g. cables such as coax cables. Also installed in the home 15 at endpoints of the channels 10 is a set of nodes 20 of which five nodes 20A-20E are shown by way of example. At least some of the nodes (20A and 20E in the illustrated embodiment, nodes 20A-20E referred to collectively hereinafter as "nodes 20") have a packet aggregation functionality in which the node forms an aggregation frame 30A, 30F by aggregating a plurality of packets 40 which have accumulated at the node. If at least one packet 40 has accumulated at the node, each node is operative, eventually, to transmit a frame including that packet and perhaps others, typically upon grant of solicited (as in the illustrated embodiment) or unsolicited permission to transmit.

Generally, as described in detail below, the system of FIG. 1 is useful in performing the following method for transmitting packets over a network of communication channels interconnecting a set of nodes. The method may include using a network access coordinator to coordinate access of the set of nodes to the network of channels by granting permission to transmit to individual nodes. The method may further include forming an aggregation frame at one (or more) node(s) by aggregating a plurality of packets which have accumulated at the node. The method may include as well informing the network access coordinator accordingly, and providing the network access coordinator with comparison information comparing different transmission possibilities for the aggregation frame. If at least one packet has accumulated at a node, the method may include transmitting at least one frame upon grant of permission to transmit to that node by the network access coordinator. Each frame may comprise at least one packet. The coordinator is typically operative to determine which portion, if any, of the aggregated packets can be transmitted. Such a determination may include determining an integral number of aggregated packets to be transmitted from among several aggregated packets which have accumulated at the relevant transmission (Tx) node.

Typically, each node comprises a modem having a CL (Convergence) layer, a MAC (Media Access Control) layer and a PHY (Physical) layer and the packet aggregation functionality is performed at the CL layer (at the ECL layer, if the packets are Ethernet packets, abbreviated "Epkts" in FIG. 1).

Each aggregation frame 30A, 30F typically comprises at least some of the following information: an indication that the frame is an aggregation frame rather than a single-packet frame and an indication of the size of at least some of the packets in the frame. This information is typically stored in the header 32 of the aggregation frame. Each packet 40 in each frame typically has a header having CRC (cyclic redundancy check) code for the header itself and CRC code for the content of the packet.

A network access coordinator 50, which may be a node itself, is operative to coordinate the access of the plurality of nodes 20 to the network of channels 10 by granting or refusing transmission requests or by granting unsolicited transmission permission. At least one of the nodes 20 is operative to inform the network access coordinator 50 when it has formed an aggregation frame 30 comprising at least one aggregated packet 40 and to provide the network access coordinator 50 with comparison information comparing different transmission possibilities for the aggregation frame. The network access coordinator 50 is operative responsively to determine which portion, if any, of the aggregated packets 40 can be transmitted including determining an integral number of aggregated packets to be transmitted.

Typically, as shown, at least one node 20 is operative to send a transmission request and the network access coordinator 50, responsively, selectively grants or refrains from granting permission to transmit. In FIG. 1, for example, node 20A requests permission to transmit three Ethernet packets (aggregated in frame 30A) to node 20B which is located in the bedroom. Permission is granted, albeit in two separate time slots (see steps I, II, and III (slot III which indicates that a split permission is granted)) whose combined length suffices to transmit the three packets Epkt1_A, Epkt2_A and Epkt3_A.

Node 20E also requests permission to transmit three Ethernet packets to node 20C which is located in the kitchen (as shown in slot IV). However, coordinator 50 grants permission to transmit only two of these (as shown in slot V). Therefore, packet Epkt3 remains at node 20E for the time being. Nodes 20B and 20C each de-aggregate the frames 30A and 30E that they respectively receive as shown.

Requests for transmission permission are preferably accompanied by comparison information typically comprising a comparison of the per-packet times required given various different transmission possibilities.

Packets 40 may comprise packets of different classes and at least one Tx node 20 may be operative to aggregate packets accumulating at the node, as a function of the class to which the packets belong. For example, in FIG. 1, node 30A accumulated two Class 2 packets, two Class 4 packets aggregated together, and another Class 4 packet not aggregated with the other two. Class 4 is a class of low priority level packets in the illustrated example. The packets in Class 2 may, for example, be characterized by having a common QoS, and/or a common priority level, and or common membership in a particular flow; and/or any other packet attribute or set of packet attributes. Aggregation "rules" observed by individual nodes may be dependent on class. For example, individual nodes 40 may be operative to aggregate only packets belonging to classes included in predefined classes and to refrain from aggregating packets belonging to classes other than those predefined classes.

Individual nodes 40 may be operative to aggregate all packets which have accumulated at the node between each of the node's transmission requests. This optional aggregation "rule" may refer to any transmission request or may be specific to transmission requests pertaining to a particular class of node.

Optionally, the system of FIG. 1 is polling-based. In polling-based systems, the network access coordinator is operative to repeatedly poll the nodes 20 for transmission requests by sending polling requests thereto. The network access coordinator subsequently may grant at least some of the transmission requests. The network access coordinator is typically operative to poll once per MAP cycle. Each Tx node 20, having accumulated at least one packet, may be operative to respond positively to the first polling request which follows a predetermined time interval after receipt of the one or more packets, and may respond negatively if the predetermined time interval has yet to elapse (e.g. negatively responding node 20D in FIG. 1). Alternatively, each Tx node 20, having accumulated at least one packet in at least one individual class of packets, may substantially immediately respond positively, to the next polling request with respect to the at least one class of packets.

If the system of FIG. 1 is not polling-based, at least one node may be operative to send a transmission request periodically. Optionally, at least one such node may be operative, in addition to sending a transmission request periodically, to send a transmission request each time a set of packets having predetermined characteristics has accumulated thereat. For example, some nodes may send a transmission request even if the defined between-request time interval has not elapsed, if more than n packets, such as 6 packets, have accumulated. Such an occurrence may reset the time for the between-request time interval. Or, a transmission request for packets in a particular class might be sent each time n packets belonging to that class have accumulated at a particular node.

Optionally, at least one node 20 is operative to aggregate no more than a predetermined maximum number of packets into each frame. For example, node 20E aggregates only up to two packets per frame or, perhaps, aggregates only up to two packets per frame if the packets are class 4 packets. Therefore, the third Class 4 packet (Epkt3_E) which accumulated at node 20E is not part of aggregation frame 30E.

The system of FIG. 1 may, for example, operate within or in conjunction with a Home Network modem in general and in particular a home network over coaxial cables such as, by way of example, the home network over Coaxial wires as described in the above-referenced MoCA specification. In the MoCA specification, a coordinated home network is described in which a Network Coordinator (also termed herein a "network access coordinator") exists and coordinates the access to the medium. Only one node is allowed to transmit at a time, creating a non collision network. This facilitates the ability to carry video as well as voice and data signals over the same network, while retaining the requirements of video and voice streaming and Quality of Service.

Figure 2:
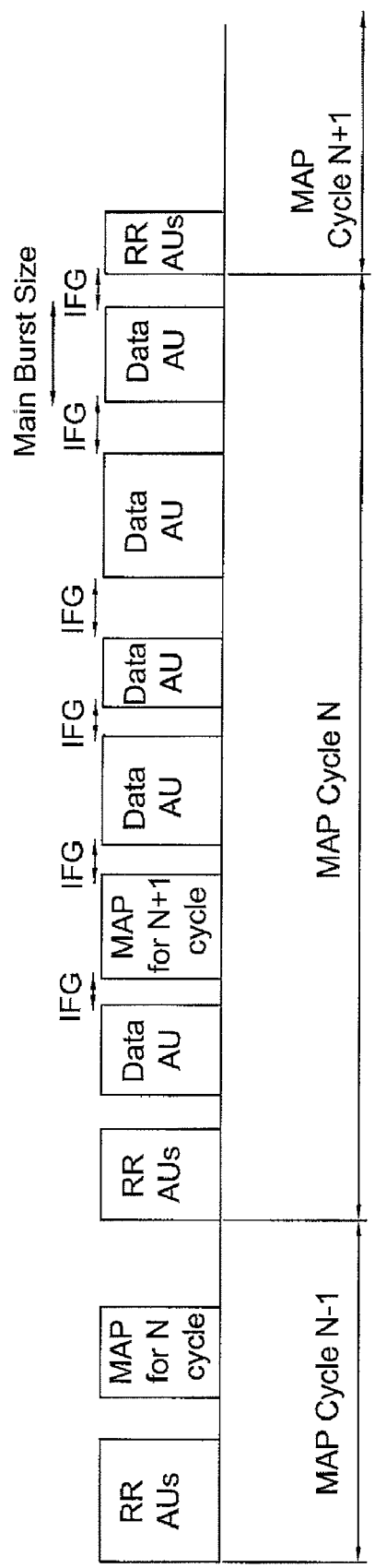
FIG. 2 is an example of a method by which a network access coordinator may control the access of a set of nodes to a medium interconnecting them.

FIG. 2 shows an example of the access method in the MoCA specification described above. Once in a MAP CYCLE, a node that has several packets (e.g., Ethernet packets) in its buffer ready to transmit sends a Reservation Request (RR) message for each packet. The Network Coordinator (NC) may then allocate a time slot for each packet transmission as is shown in FIG. 2.

Typically, the transmission is bursty, each burst including a Preamble, a Header, the data Payload and an FCS (Frame Checker Sequence). Moreover, Inter Frame Gaps between frame transmissions are provided and a minimal Burst size may be specified. If a packet is shorter than the minimal packet size a minimal packet size time slot may still allocated. All these exemplary requirements create overheads that reduce the effective throughput of the network.

Figure 3A:
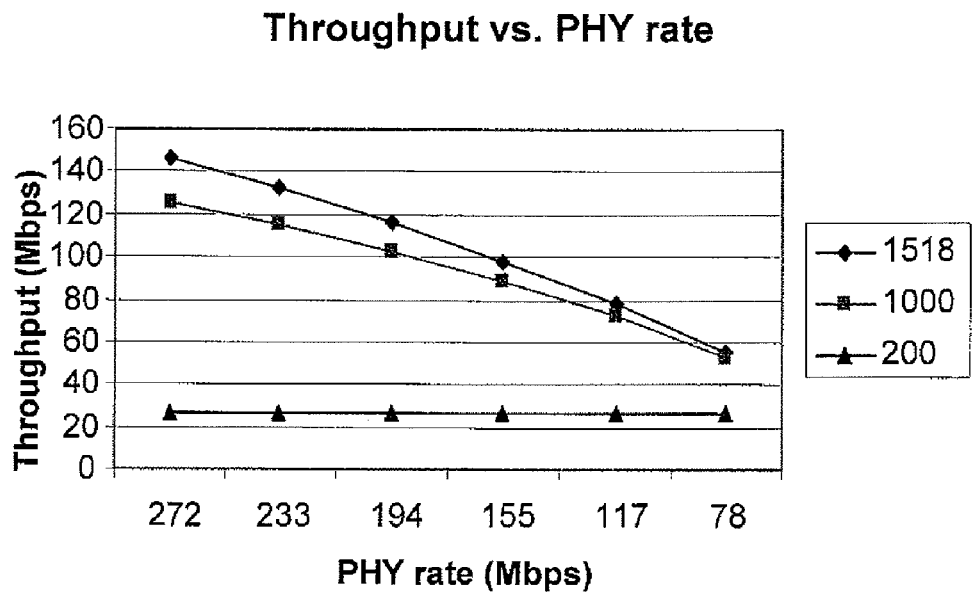
FIG. 3A is a graph of typical network throughput as a function of PHY rate, for a conventional un-aggregated packet.

FIG. 3A shows throughput (the actual information rate sent over the network) vs. the PHY rate (the available data rate) for the following sizes of Ethernet packets: 1518 Bytes, 1000 Bytes and 200 Bytes. It is clear that the available throughput is significantly less than what is available, decreasing significantly as the packet size or even smaller.

Figure 3B:
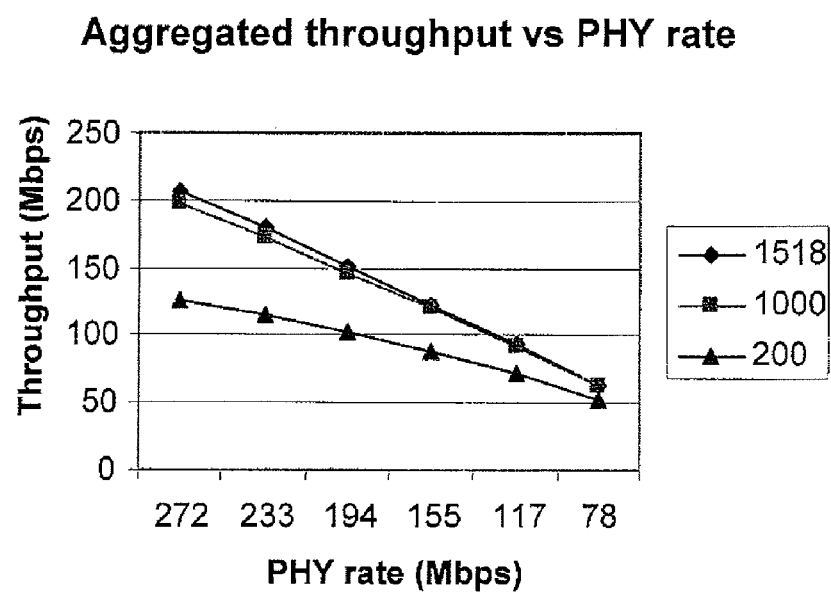
FIG. 3B is a graph of typical network throughput as a function of PHY rate, for an aggregated frame of packets provided in accordance with a preferred embodiment of the present invention, showing improvement vis a vis the graph of FIG. 3A.

One method to increase the throughput is to aggregate several incoming packets (e.g. Ethernet packets) and to send all of them in a single time allocation and single transmission frame. FIG. 3B is a graph depicting effective throughput vs. PHY rate with five packet-aggregation, which demonstrates clear improvement in the effective throughput.

Two alternative methods for packet aggregation in a coordinated home network according to the invention are now described. The first is Ethernet Convergence Layer packet aggregation; the second is MAC Layer packet aggregation. The two may co-exist on the network. Nodes that support these methods may also support the non-aggregated scheme as specified in the MoCA specification described above. This allows new network nodes that support packet aggregation to be interoperable with legacy nodes that do not support aggregation.

It is appreciated that as a standard Local Area Network (LAN) the home network in LAN is built in (ISO mode) Layers as shown in FIGS. 4A and 4B. These layers include Layers 1 and 2 (PHY 310 and MAC 312, as shown in FIG. 4A) and a Convergence Layer 314 that bridges between MAC layer 312 and Ethernet 316. Alternatively, as shown in FIG. 4B, ECL 314' can bridge between another Layer 2 protocol (like 1394, USB or Ethernet) and its own Layer 2 frame aggregating/de-aggregating MAC layer 312'. Also shown in FIG. 4B are PHY layer 310' and Ethernet 316'. In the embodiment described herein, Ethernet and Ethernet Convergence Layer (ECL) are considered.

A preferred method for Ethernet convergence layer packet aggregation is now described, for a situation in which Ethernet packets are arriving from an external source, such as a GMII or MII interface.[1] A conventional Ethernet packet structure is depicted in FIG. 5 and comprises an Ethernet Header field 330, the payload field 332

[1] Media Independent Interface (MII) and Gibabit Media Independent Interface (GMII) are interfaces between the Media Access Control (MAC) device and the physical layer (PHY). GMII is preferably backwards compatible with MII.

and a check sum (FCS or Frame Check Sequence) 334. Ethernet Header 330 includes data on the source and destination addresses as well as information on priorities and other information that may be used in the course of further processing of the Ethernet packet. Payload 332 is the actual transmitted Ethernet data and Check sum 334 is a result of CRC processing to detect packet errors.

According to one embodiment of the present invention, aggregation is implemented on the ECL. The ECL collects Ethernet packets that have the same destination as well as priority in a queue.

Typically, when ready to transmit, the aggregated Ethernet packets are encapsulated into an ECL Frame structure that comprises a MAC header 380, a multi-frame header 350, an Ethernet header 344, a payload 346, a multi-frame check sequence (CRC) (optional) 348 and frame check sum 382 as depicted in FIG. 6. Ethernet header 344, a payload 346, a multi-frame check sequence (CRC) (optional) 348 and frame check sum 382 may be considered as a single Ethernet packet structure 342. Header 344, payload 346 and check sequence multi-frame header 350 may contain at least the following information: source address, destination address, priority, number of encapsulated frames, byte lengths of the individual frames and, optionally, a header checksum.

Typically, Ethernet headers 344 of the aggregated Ethernet packets are encapsulated together with payload 346. Ethernet frame checksum 382 may also be aggregated; but is typically not required to detect errors in the aggregated packet at the receiver. The aggregated ECL packet has a structure similar to a single Ethernet packet but is larger in size. It is delivered to the MAC Layer who handles it as a regular Ethernet packet. The size of the Aggregated ECL packet can be as high as 64 KB, however, a size of 5 Ethernet packets (about 8 KB) is large enough to gain the enhancement achievable through packet aggregation. Preferably, at the receiving side, the MAC transfers the received Aggregated ECL packet back to the ECL Layer, where the multi-frame checksum 382 is checked, and the multi-frame header processed to de-aggregate the embedded Ethernet packets.

The Reservation Request and grant are typically handled by the MAC in the same way as it handles non-aggregated packets. The MAC simply regards the aggregated packet as a single MSDU (MAC Service Data Unit).

Figure 7:
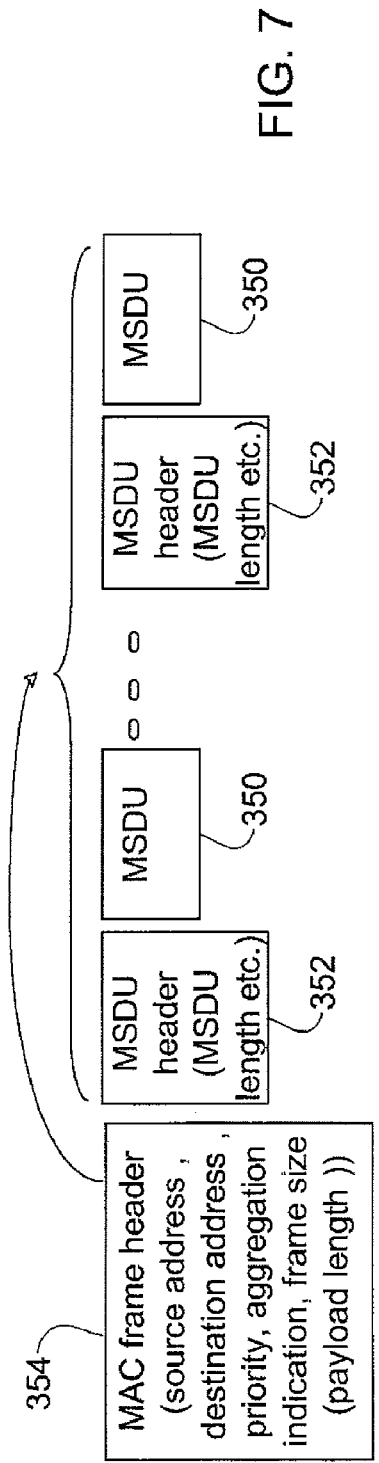
FIG. 7 is a simplified diagram illustrating a preferred method by which the MAC layer of a node aggregates individual MAC service data units into a single frame, operative in accordance with a preferred embodiment of the present invention.

The second exemplary aggregation method according to the invention, MAC layer packet aggregation, is now described. Typically, the MAC layer aggregation method is agnostic to the upper Layer 2 protocol and therefore is not restricted to Ethernet frames but can be used for other protocols. The MAC receives individual MAC Service Data Units (MSDU) from the upper layer and aggregates them, e.g., as shown in FIG. 7. The MSUs may be Ethernet packets but may also be of other type of packets.

Figure 8:
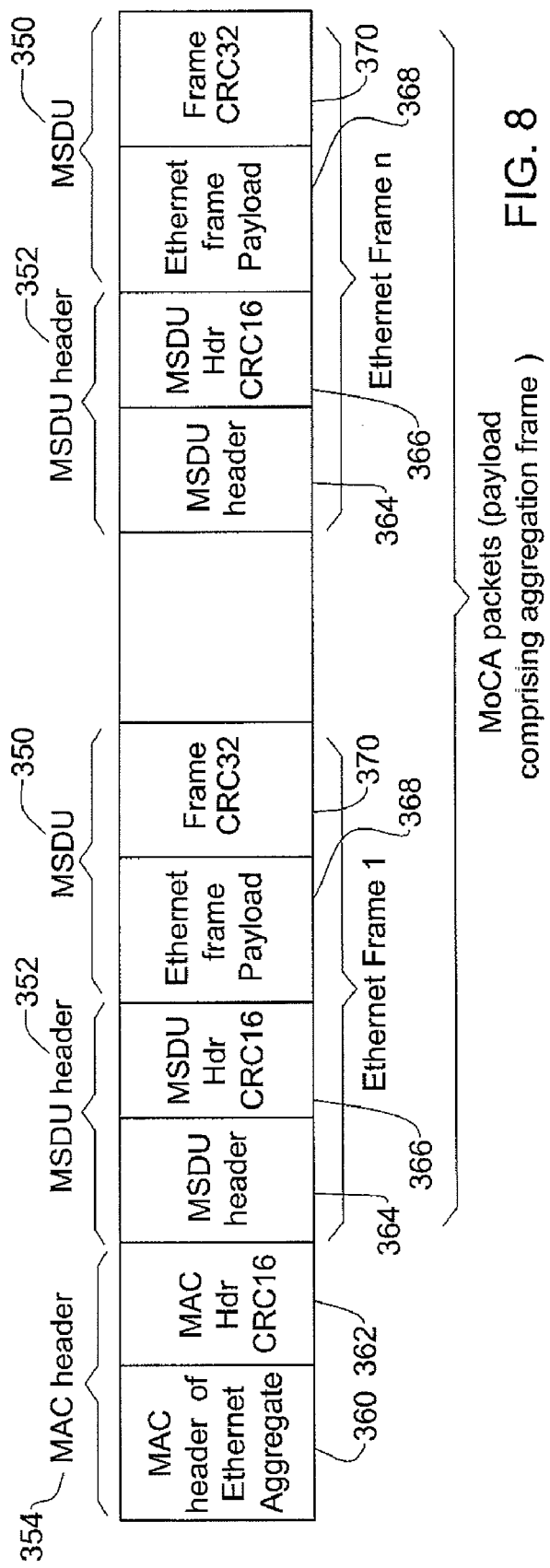
FIG. 8 is a simplified diagram of a frame aggregated in accordance with a preferred embodiment of the present invention.

Typically, the MAC frame header 354 (which includes source address, destination address, priority, aggregation indication, frame size (payload length)) appends a short MSDU header 352 for each individual MSDU 350 and a CRC (as shown in FIG. 8) to each individual MSDU to create a multi-frame with a multiplicity of MAC MSDUs. FIG. 8 shows each a MAC header 354 (which may include MAC header of Ethernet Aggregate 360, MAC Hdr CRC 16 362) MSDU header 352 (MSDU header 364, MSDU Hdr CRC 16 366), MSDU 350 (including Ethernet frame Payload 368 and Frame CRC32 370). MSDU header 352 and MSDU 350 may be considered to form Ethernet Frame 1. This structure enables the receipt of individual MSDUs at the receiver. If an error occurs at one of the MSDUs, the others can still be received correctly. Aggregation is performed per destination node ID and source node ID and priority. The information contained in the Frame header is similar to that contained in the ECL multi-frame. At the received side, the MAC de-aggregates the multi-frame into individual packets.

In accordance with the second aggregation method, reservation requests and grants are handled by the MAC using, for example, one of the following methods:

1. The requesting node sends a single request for the entire aggregated frame, and the Coordinator grants (or does not grant) the whole frame as a single MSDU.

2. The requesting node sends a reservation request per each one or per several of the MSDUs in the aggregated frame, handling the aggregated frame the same way as the requesting node handles MSDUs. The Coordinator is responsible for "deciding" on the aggregation as well as on the number of MSDUs to be aggregated, and sends a grant appropriately. A particular advantage of this method is more control and flexibility for the network coordinator.

In an exemplary hybrid MoCA network, if the network coordinator supports packet aggregation it is possible to send aggregated packets between any two nodes that support aggregation as described herein. Preferred methods for requesting, granting and sending an aggregated frame are now described.

An exemplary packet, such as a MoCA packet, may be aggregated with multiple Ethernet frames having the same priority level and same destination node. A MoCA control packet typically cannot be aggregated. Typically, there is a maximum number of Ethernet frames that can be aggregated in a single MoCA packet.

Typically, each MoCA node that wants to send a MoCA packet with multiple Ethernet frame requests from the network coordinator the duration which would be required for each Ethernet frame to be sent in its own MoCA packet. The MoCA node may further indicate the time that will be saved if the same were sent in a single aggregate packet. The network coordinator may grant a slot for sending all aggregated Ethernet frames which have accumulated as a single packet or may split the Ethernet frames into two or more MoCA packets. In accordance with the MAP received from the network coordinator, the node sends its Ethernet frames, in one burst or in multiple bursts. The time saved when sending multiple Ethernet frames in one packet is typically limited to the time related to the transmitting of the preamble overhead and may not include the FEC (Fast Ethernet Channel (a method for bundling Ethernet channels)) or ACMT (a variation of OFDM modulation known as Adaptive Constellation Multitone) padding.

It is appreciated that for simplicity, the present specification assumes that a node typically responds to polling requests, either positively or negatively. A positive response occurs when the node reports accumulation of nodes and requests permission to transmit. A negative response occurs when the node receives a polling request but refrains from requesting permission to transmit. It is appreciated that a single response may be positive with respect to certain classes of packets and negative with respect to other classes of packets—e.g., the node may request permission to transmit packets which have accumulated from flow A and may refrain from requesting permission to transmit packets which have accumulated from flow B.

It is also appreciated that packets are sometimes divided into or partitioned into different classes. They can then be aggregated regardless of class or with regard to class. A class may comprise a level of priority and/or at least one of a common source and destination addresses.

Some embodiments of the invention relate to fitting aggregation in with existing industry standards. In order to fit into the current the MoCA standard, and to make the aggregation efficient, without additional overhead, a scheme according to the invention where aggregation is requested by an Existing Node (EN) and is granted by the Network Controller (NC) is described using the existing Reservation Request (RR) and grant mechanism. In this scheme, the NC is capable of granting all or part of the aggregation request. The EN may request another transmission opportunity for the un-granted packets on the next Media Access Plan (MAP) cycle.

Some benefits associated with this scheme include but are not limited to the following benefits: Aggregation can be performed at the MAC (Media Access Control) layer, each Ethernet packet is protected by its own CRC, built-in fragmented aggregation is obtained, aggregation is driven by the NC to provide better bandwidth utilization, a degenerate mode according to the invention allows simple packet aggregation protocol with a robust frame structure, and the scheme is scalable with aggregated frame size and number of aggregated packets.

A media-over-coax protocol is now described with reference to FIGS. 9-12. FIG. 9 is a table of Frame Types and Sub Type Formats in accordance with an embodiment of the present invention. FIG. 10 is a table summarizing Ethernet Aggregate SDU format in accordance with an embodiment of the present invention. FIG. 11 is a table summarizing a format for an Asynchronous Aggregate Data Reservation Request Element in accordance with an embodiment of the present invention. FIG. 12 is a table summarizing a format for Aggregate Data Allocation in accordance with one embodiment of the present invention.

Typically, in one embodiment, each Ethernet frame computes its transmit duration including the overheads (e.g., preamble, FEC (Forward Error Correction) and symbol padding). The duration value is placed in the DURATION field in the reservation request element. The value of the SAVE_DURATION field is the duration of the preamble. In the reservation request of the first Ethernet frame the save time is typically set to zero. All Ethernet frames which, as per the reservation request, are to be sent in aggregation may be marked with the same value of the toggle bit in the REQUEST_ID field. The consecutive same value in the toggle bit associates the RR (reservation request) to the single MoCA packet. All reservation requests to be sent in a single MoCA packet are typically arranged one after the other, without other reservation request elements in between.

Typically, in one embodiment of the invention, the network coordinator sees the MAP constraints and, in accordance therewith, allocates the slot for an aggregate packet. If one packet is allocated for all Ethernet frames, the network coordinator supplements all durations in the reservation request related to the same MoCA packet and subtracts all saved durations. The result is the burst time of the aggregate packet. If the network coordinator allocates multiple packets to the Ethernet frames, the saved duration of the first Ethernet frame in the MoCA packet may not take into account the burst time computation. The Request ID typically places in the AU the last sequence ID of the Ethernet frame in the MoCA aggregate packet.

Figures 13A, 13B:
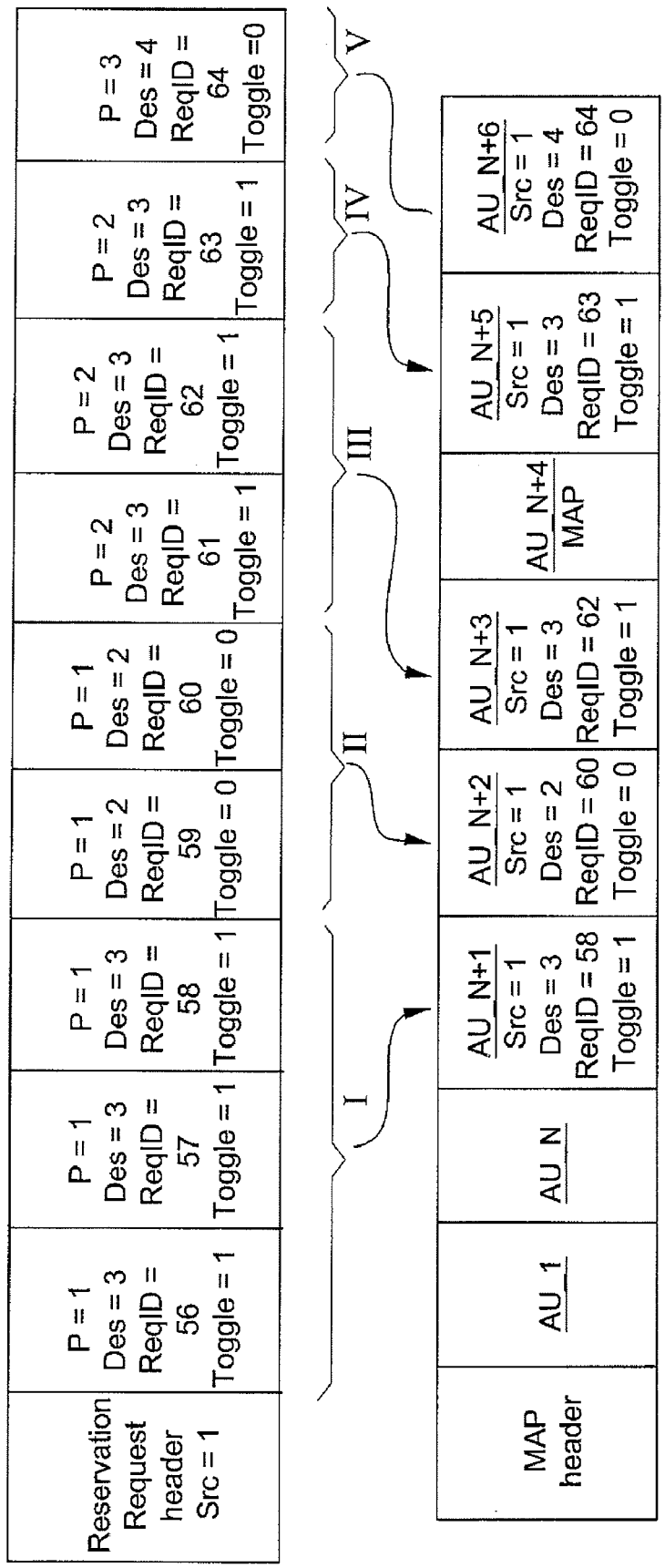
FIG. 13 is a simplified diagram of an example of a packet aggregation process operative in accordance with a preferred embodiment of the present invention.

FIGS. 13A and 13B are an example of a packet aggregation process provided in accordance with another embodiment of the present invention. As shown by Roman numerals I, II, and III in FIG. 13 A, multiple packets can be aggregated into single units, as shown in FIG. 13B.

Figure 14:
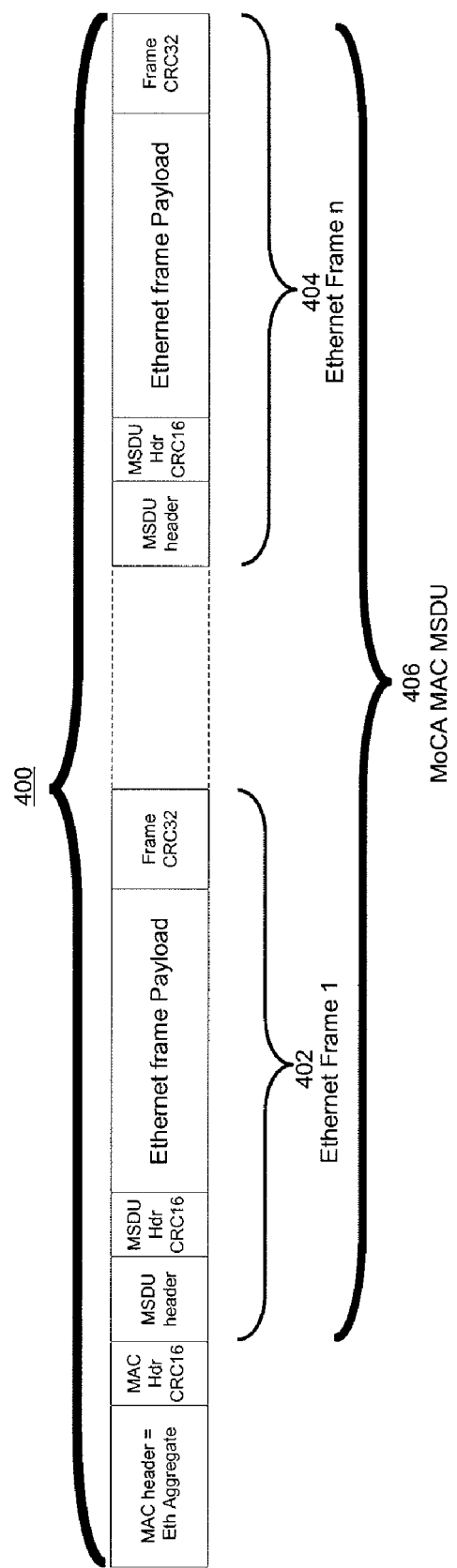
FIG. 14 shows an aggregated frame structure according to the invention.

FIG. 14 shows a preferred embodiment of an aggregated frame structure 1400 according to the invention. Structure 1400 includes multiple Ethernet packets, such as frame 1 402 and frame n 404. Packets 402 and 404 may share a common Ethernet Destination Address and the same priority level (tagging) or QoS flow, and may be aggregated into a single MoCA MAC Aggregated Frame (AF). In one embodiment of the invention, MoCA control packets may not be aggregated. Nevertheless, other embodiments of the invention may contemplate situations where the MoCA control packets are aggregated.

In one embodiment of the invention, Ethernet packets such as packets 402 and 404, can be aggregated until one the following conditions occur: 1) the node is scheduled to transmit a Reservation Request (RR) and 2) either the size threshold or the maximum latency threshold for the aggregated frame has been reached.

The aggregated MAC frame 400 in FIG. 14 can include a MAC header having the same structure of a MoCA 1.0 MAC Header and a sequence of MAC Service Data Units (MSDUs) 406 comprising of a Header, the MSDU payload and an FCS (Frame Check Sequence) based on CRC (Cyclic Redundancy Check).

The structure of the MAC Header is depicted in the Table shown in FIG. 15. As shown in FIG. 15, a new FRAME_SUBTYPE is added to the Ethernet Transmission Frame Type to indicate an Aggregated Ethernet frame.

The Aggregated Ethernet format is depicted in the Table shown in FIG. 16.

It should be noted that the following described embodiment is one embodiment of a method according to the invention. The possibility of other methods according to the invention, or, alternatively, select portions of the following method, are within the scope of this disclosure.

For the purpose of the following description, a Transmitting Node (TN) is a node with pending aggregated packets that is requesting transmission opportunities for the transmission of the pending aggregated packets. A Transmitting Node can either be an EN or an NC.

In the next RR message, the transmitting EN may request a reservation for the Aggregated Frame in the manner described below. The way that the NC handles its pending aggregated request may be implementation dependent.

The NC may either grant the whole Aggregated Frame, grant a part of the Aggregated Frame, or distribute the Aggregated Frame over several time slots in the next MAP cycle, so that latency requirements are kept and bandwidth is optimized for performance. Those skilled in the art will recognize that various algorithms are available to perform this optimization. The ungranted packets may either be requested again by the transmitting node or discarded by the transmitting node.

The aggregation method is based on "Aggregation Quantum (AQ)". The Aggregation Frame (AF) is composed of one or more "Aggregation Quantum" units which allow the NC to break the Aggregated Frame into multiple transmission grants. Each AQ has a predefined (by software configuration) nominal size (in ACMT symbols). The actual size of an AQ is determined by the Transmitting Node (TN) during the build up of the Aggregation Frame as described below in the portion of the specification corresponding to FIG. 17.

AQs preferably map multiple whole Ethernet packets (i.e. Ethernet packets are not fragmented).

Figure 17:
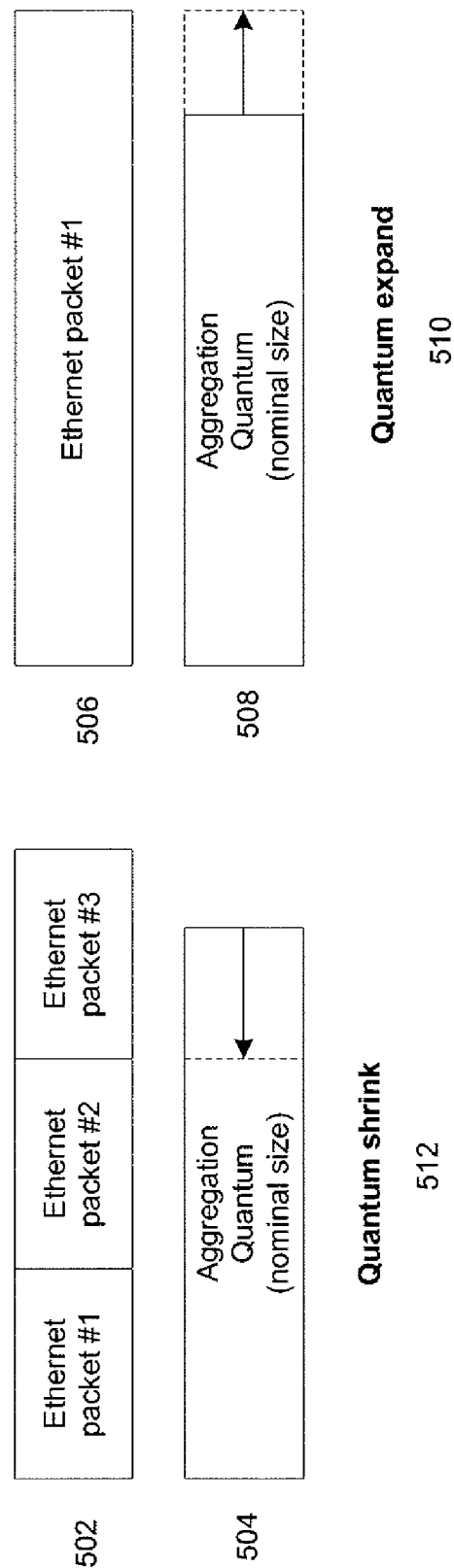
FIG. 17 shows an illustration of actual vs. nominal aggregation quantum size according to the invention.

FIG. 17 shows an illustration of actual vs. nominal aggregation quantum size. The nominal AQ size may be set by software configuration. The nominal size of the AQs may be different, such as nominal sizes 504 and 508, for different AQ units, 502 and 506, inside Aggregated Frames. For example, the first AQ may have a size that fits at least a minimal burst size, while following AQs may be smaller in size. During Aggregation Frame build up, the AQ size may be expanded 510 or reduced 512 once to a whole number of Ethernet packets as is shown in FIG. 17.

Prior to the aggregation build up, the number of data bytes in each AQ nominal size may be calculated, for example, according to MoCA 1.0 par. 4.3.3. This calculation depends on the number of bits per ACMT symbol (Nbas). It can be done a priore and be updated when the Bit Loading profile is updated.

Figure 18:
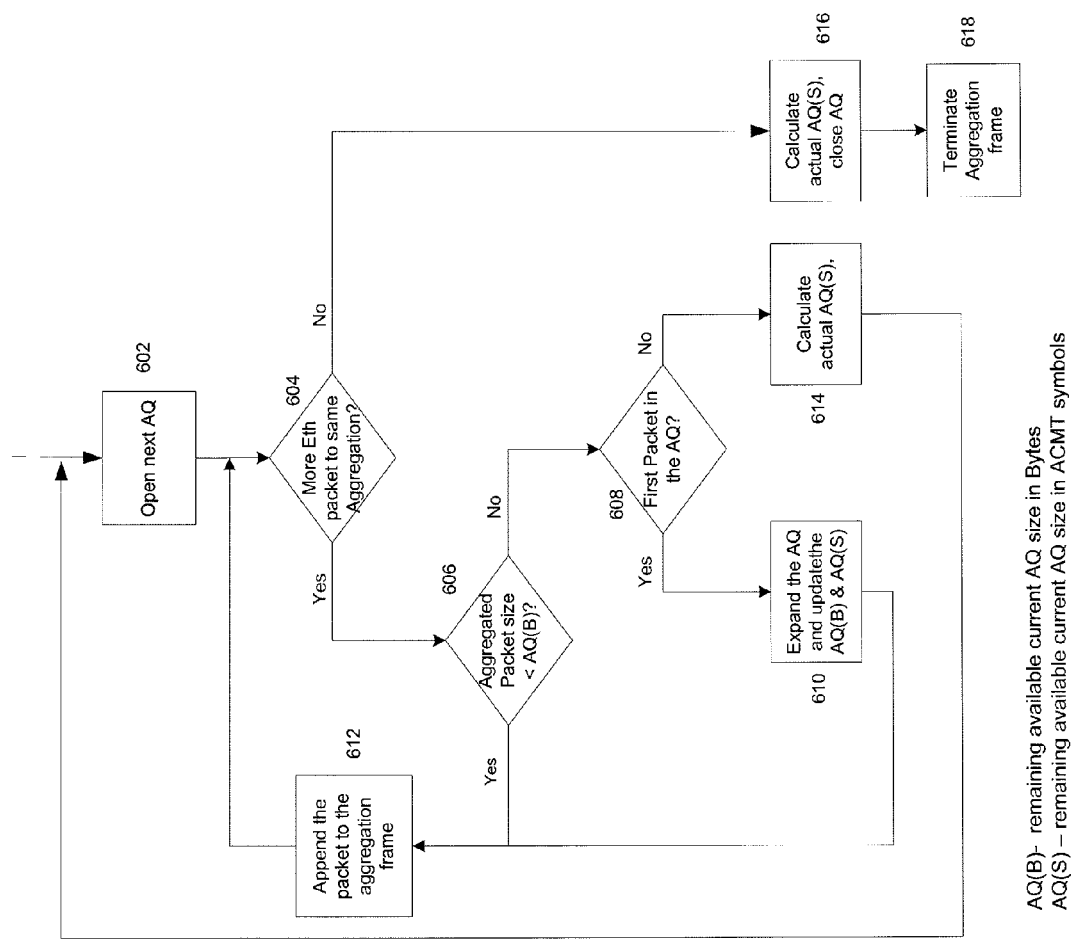
FIG. 18 shows an flow chart of an Aggregated Frame build process according to the invention.

The Aggregated Frame build process is depicted in FIG. 18. More particularly, FIG. 18 is a flow chart for RR for aggregation build up.

Step 602 shows the start of the aggregating the packets into an AQ until either the number of remaining bytes of the nominal AQ is not big enough to accommodate the next Ethernet packet or there are no more outstanding Ethernet packets. Step 604 shows the querying to begin setting the actual size of an AQ (in Bytes). The process of setting may include: (1) If the nominal size of an AQ is exceeded by the size of the next Ethernet packet to be aggregated, as shown in step 606, the transmitting EN may reduce the AQ size so that the AQ size in Bytes is the smallest multiplication of Nbas (Number of Bytes per ACMT symbol) that is larger than the boundary of the last aggregated packet. Any next Ethernet packet may be placed in a new AQ.

(2) If the nominal size of an AQ is exceeded by the size of the first packet to be aggregated, as shown in step 608, the transmitting EN expands the AQ size, as shown in step 610, so that the AQ size in Bytes is the smallest multiplication of Nbas that is larger than the size of the first Ethernet packet. The transmitting EN may continue to aggregate packets to the expanded AQ, as shown in step 612, until its remaining bytes are not big enough to accommodate the next aggregated packet. In certain embodiments of the invention, an AQ can be expanded only once. If it is not the first packet as determined in step 608, then the AQ(S) may be calculated as shown in step 614 before returning to step 602.

Step 616 shows calculating the actual AQ(S) duration according to, for example, MAC Frame size rules found in MoCA 1.0 par. 4.3.3. Step 618 shows terminating the aggregation frame and building the reservation request as described in more detail below.

FIG. 19 shows a table illustrating an asynchronous aggregated data reservation request element format for use with systems and methods according to the invention. FIG. 20 shows a table illustrating an aggregated data allocation unit format.

Protocol details for processes according to the invention, and specifically the details that relate to the reservation request element for the aggregation frame, may be built from the RR element and sub elements describing the aggregation quanta. The RR element is numbered by REQUEST_ID as in, for example, MoCA1.0, and the aggregation sub elements may be numbered by SUB_ELEMENT_NO starting at 1 for the first aggregation sub element.

The NC in the Data Allocation Unit (DAU) response, for example, may copy the REQUEST_ID of the corresponding RR, and may add the FROM_SUB_ELEMENT and TO_SUB_ELEMENT fields according to the mapping of the aggregation frame into the DAU.

The transmitting node may fill in the OVERHEAD_DURATION field in its RR element including the duration of the Preamble corresponding to the aggregated frame transmission. The DURATION field in the sub element is filled with the transmission time of the data symbols calculated according to MoCA 1.0 4.4.3 (note that this original calculation may preferably not include the aggregation preamble).

The NC can calculate the aggregation frame duration by accumulating the DURATION time of all sub elements and the addition of the corresponding OVERHEAD_DURATION.

The Receiver node may de-aggregate the frame by de-capsulating the MAC header and MSDU headers. The MAC header indicates that the frame is a MoCA aggregated frame and may also indicate the total size of the aggregated frame. The subsequent MSDU headers indicate the size of the encapsulated Eth packets. The MSDU header and the payload are preferably protected by CRC. Accordingly, If a MSDU header's CRC is invalid, the node may stop the de-aggregation and drop the remaining frame.

If a payload's CRC is invalid, the node may drop the packets within the payload and continue to de-aggregate the next MSDU if any.

Figure 21:
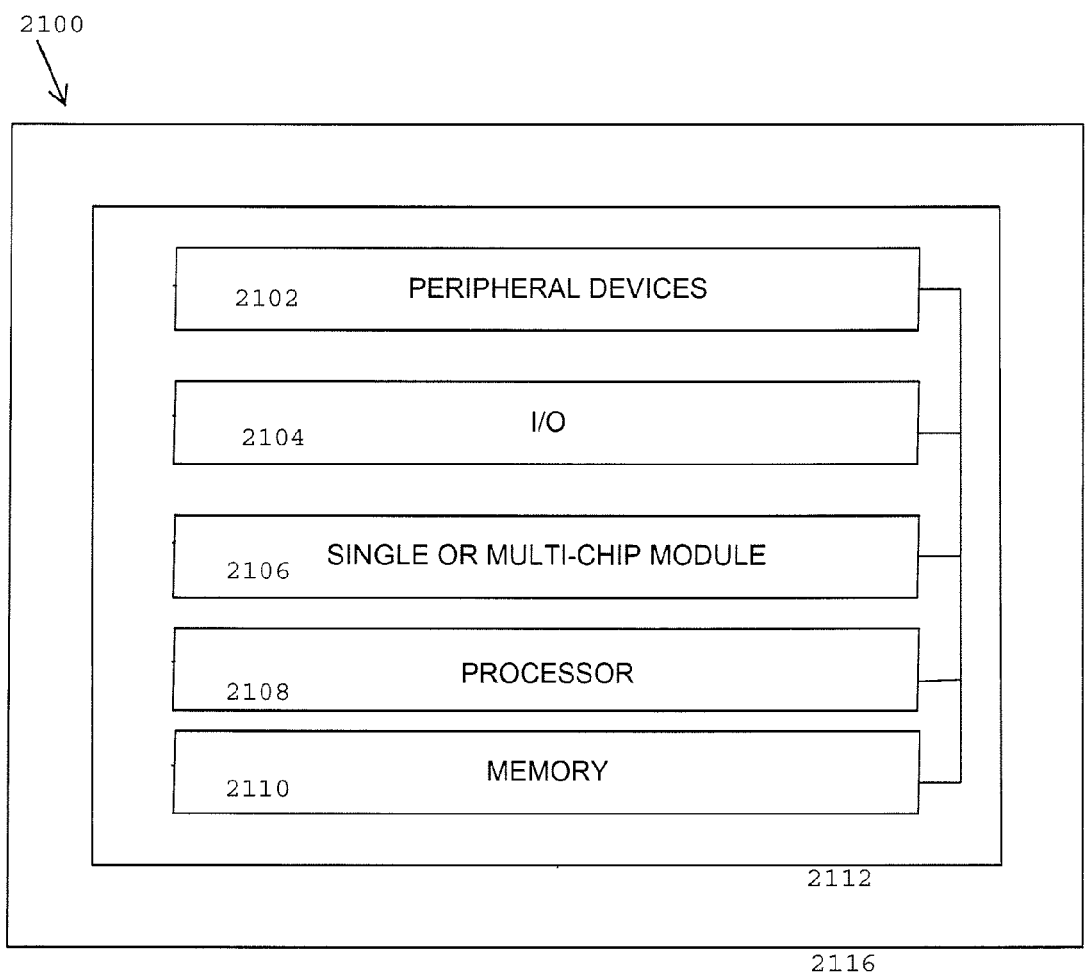
FIG. 21 shows a schematic diagram of an illustrative single or multi-chip device that may be used in accordance with principles of the invention.

FIG. 21 shows a single or multi-chip module 2102 according to the invention, which can be one or more integrated circuits, in an illustrative data processing system 2100 according to the invention. Data processing system 2100 may include one or more of the following components: I/O circuitry 2104, peripheral devices 2106, processor 2108 and memory 2110. These components may be coupled together by a system bus or other interconnections 2112 and are disposed on a circuit board 2120 in an end-user system 2130 that may be in communication with a coax medium via an interface.

For the sake of clarity, the foregoing description, including specific examples of parameter values provided, is sometimes specific to certain protocols such as those identified with the name MoCA™ and/or Ethernet protocols. However, this is not intended to be limiting and the invention may be suitably generalized to other protocols and/or other packet protocols. The use of terms that may be specific to a particular protocol such as that identified by the name MOCA™ or Ethernet to describe a particular feature or embodiment is not intended to limit the scope of that feature or embodiment to that protocol specifically; instead the terms are used generally and are each intended to include parallel and similar terms defined under other protocols.

It is appreciated that software components of the present invention including programs and data may, if desired, be implemented in ROM (read only memory) form including CD-ROMs, EPROMs and EEPROMs, or may be stored in any other suitable computer-readable medium such as but not limited to disks of various kinds, cards of various kinds and RAMs. Components described herein as software may, alternatively, be implemented wholly or partly in hardware, if desired, using conventional techniques.

Features of the present invention which are described in the context of separate embodiments may also be provided in combination in a single embodiment. Conversely, features of the invention which are described for brevity in the context of a single embodiment may be provided separately or in any suitable subcombination.

What is claimed is:

1. A system for transmitting packets over a network of communication channels, the system comprising:
    a set of nodes comprising at least one node having a packet aggregation functionality in which the node forms an aggregation frame by aggregating a plurality of packets which have accumulated at the node, wherein, if at least one packet has accumulated at the node, each node is additionally operative to transmit at least one frame, each frame comprising at least one packet;
    a network access coordinator, comprising at least partially a hardware component, said coordinator operative to coordinate the access of the plurality of nodes to the network of channels,
    wherein at least one node is operative to inform the network access coordinator when it has formed an aggregation frame comprising a plurality of aggregated packets and to provide the network access coordinator with comparison information comparing different transmission possibilities for said aggregation frame,
    wherein said comparison information comprises a comparison of the per-packet times required to transmit at least one of the aggregated packets in said aggregation frame using said different transmission possibilities;
    and wherein said network access coordinator is operative responsively to determine which portion, if any, of said aggregated packets can be transmitted including determining an integral number of aggregated packets to be transmitted from among said plurality of aggregated packets.

2. A system according to claim 1 wherein said at least one node is operative to send a transmission request and wherein said network access coordinator, responsively, selectively grants or refrains from granting permission to transmit.

3. A system according to claim 2 wherein said at least one node is operative to aggregate packets which have accumulated at the node during each of a set of time intervals extending from each of the node's transmission requests vis a vis said packets, to the next of the node's transmission polling requests vis a vis said packets.

4. A system according to claim 2 wherein said at least one node is operative to send a transmission request periodically.

5. A system according to claim 4 wherein said at least one node is operative, in addition to sending a transmission request periodically, to send a transmission request each time a set of packets having predetermined characteristics has accumulated thereat.

6. A system according to claim 1 wherein said network access coordinator is operative to repeatedly poll the set of nodes for transmission requests, by sending polling requests to said set of nodes, and to grant at least some of said transmission requests.

7. A system according to claim 6 wherein said at least one node, having accumulated at least one packet in at least one individual class of packets, is operative to respond positively to the next polling request vis a vis said at least one class of packets.

8. A system according to claim 1 wherein said network access coordinator is operative to grant at least one transmission request to transmit an aggregation of a first plurality of packets by allocating a second plurality of slots whose combined length suffices to transmit said first plurality of packets.

9. A system according to claim 8 wherein said network access coordinator is operative to poll once per MAP (Media Access Plan) cycle.

10. A system according to claim 8 wherein said at least one node, having accumulated at least one packet in at least one individual class of packets, is operative to respond positively to a first polling request with respect to said at least one class of packets which follows a predetermined time interval after receipt of said at least one packet.

11. A system according to claim 1 wherein said aggregation frame comprises at least some of the following information:
    an indication that the frame is an aggregation frame; and
    an indication of the size of at least some of said packets.

12. A system according to claim 1 wherein information characterizing the aggregation frame is stored in the header of said aggregation frame.

13. A system according to claim 1 wherein said at least one node transmits each packet with:
    an accompanying header having CRC (Cyclic Redundancy Check) code for the header; and
    CRC code for the packet.

14. A system according to claim 1 wherein said at least one node is operative, upon receiving an aggregation frame comprising a plurality of aggregated packets, to de-aggregate said aggregated packets.

15. A system according to claim 1 wherein said network access coordinator comprises a node.

16. A system according to claim 1 wherein at least one of said channels comprises a wired channel.

17. A system according to claim 16 wherein said wired channel comprises a cable.

18. A system according to claim 1 wherein said at least one node comprises a modem having a CL (Convergence) layer, a MAC (Media Access Control) layer and a PHY (Physical) layer and wherein the packet aggregation functionality is performed at the CL layer.

19. A system according to claim 1 wherein said plurality of packets comprises packets of different classes and said at least one node is operative to aggregate packets accumulating at the node as a function of the class to which the packets belong.

20. A system according to claim 19 wherein said classes differ in at least one of the following attributes:

priority level;

membership of the packet in different flows; and quality of service.

21. A system according to claim 20 wherein node aggregates only packets belonging to classes included in predefined classes and refrains from aggregating packets belonging to classes other than said predefined classes.

22. A system according to claim 1 wherein said at least one node is operative to aggregate no more than a predetermined maximum number of packets into each frame.

23. A method for transmitting packets over a network of communication channels interconnecting a set of nodes, the method comprising:

using a network access coordinator, comprising at least partially a hardware component, said coordinator to coordinate access of the set of nodes to the network of communication channels by granting permission to transmit to individual nodes from among the set of nodes;

forming an aggregation frame by aggregating a plurality of packets which have accumulate at a single node, informing the network access coordinator accordingly, and providing the network access coordinator with comparison information comparing different transmission possibilities for said aggregation frame;

wherein said comparison information comprises a comparison of the per-packet times required to transmit at least one of the aggregated packets in said aggregation frame using said different transmission possibilities; and if at least one packet has accumulated at a node, transmitting at least one frame, each frame comprising at least one packet;

wherein said using step comprises determining which portion, if any, of said aggregated packets can be transmitted including determining an integral number of aggregated packets to be transmitted from among said plurality of aggregated packets.

24. A method according to claim 23 wherein said packets comprise Ethernet packets and said CL (Convergence) layer comprises an ECL (Ethernet Convergence) layer.

* * * * *